(12) United States Patent
Motoe et al.

(10) Patent No.: US 7,262,961 B2
(45) Date of Patent: Aug. 28, 2007

(54) INFORMATION PROCESSING APPARATUS AND METHOD FOR CONTROLLING THE SAME

(76) Inventors: Hironori Motoe, c/o Intellectual Property Division, Toshiba Corporation, 1-1, Shibaura 1-chome, Minato-ku, Tokyo 105-8001 (JP); Shingo Koide, c/o Intellectual Property Division, Toshiba Corporation, 1-1, Shibaura 1-chome, Minato-ku, Tokyo 105-8001 (JP); Daisuke Maehara, c/o Intellectual Property Division, Toshiba Corporation, 1-1, Shibaura 1-chome, Minato-Ku, Tokyo 105-8001 (JP)

( * ) Notice: Subject to any disclaimer, the term of this patent is extended or adjusted under 35 U.S.C. 154(b) by 0 days.

(21) Appl. No.: 11/444,069

(22) Filed: May 31, 2006

(65) Prior Publication Data

US 2006/0282594 A1  Dec. 14, 2006

(30) Foreign Application Priority Data

May 31, 2005  (JP) .............................. 2005-160350

(51) Int. Cl.
*G06F 1/16* (2006.01)

(52) U.S. Cl. ...................... 361/686; 710/300; 711/163; 429/22

(58) Field of Classification Search ................ 710/300, 710/301; 711/105, 167, 163; 429/22, 23; 345/473; 361/679–687, 724–727
See application file for complete search history.

(56) References Cited

U.S. PATENT DOCUMENTS 6,381,129 B1 * 4/2002 Shimada et al. ............. 361/683
2006/0282633 A1 * 12/2006 Iwai .......................... 711/163

FOREIGN PATENT DOCUMENTS

| JP | 09-311993 | 12/1997 |
| JP | 3093782 U | 2/2003 |
| JP | 2004-029963 | 1/2004 |

* cited by examiner

*Primary Examiner*—Hung Van Duong
(74) *Attorney, Agent, or Firm*—Knobbe Martens Olson & Bear, LLP

(57) ABSTRACT

According to one embodiment, an information processing apparatus includes, a body, a bay portion provided in the body and in which a one of a first device having a first relay board and a second device having a second relay board is removably inserted, a first controller which communicates with the first device, a second controller which communicates with the second device, and a connector provided in the bay portion and connected to the first relay board or the second relay board, and including a plurality of first signal pins connected to the first controller via a first bus, a plurality of second signal pins connected to the second controller via a second bus, two ground pins connected to a common ground, a first power supply pins and a second power supply pins, and one of the second signal pins locates between the two ground pins.

9 Claims, 10 Drawing Sheets

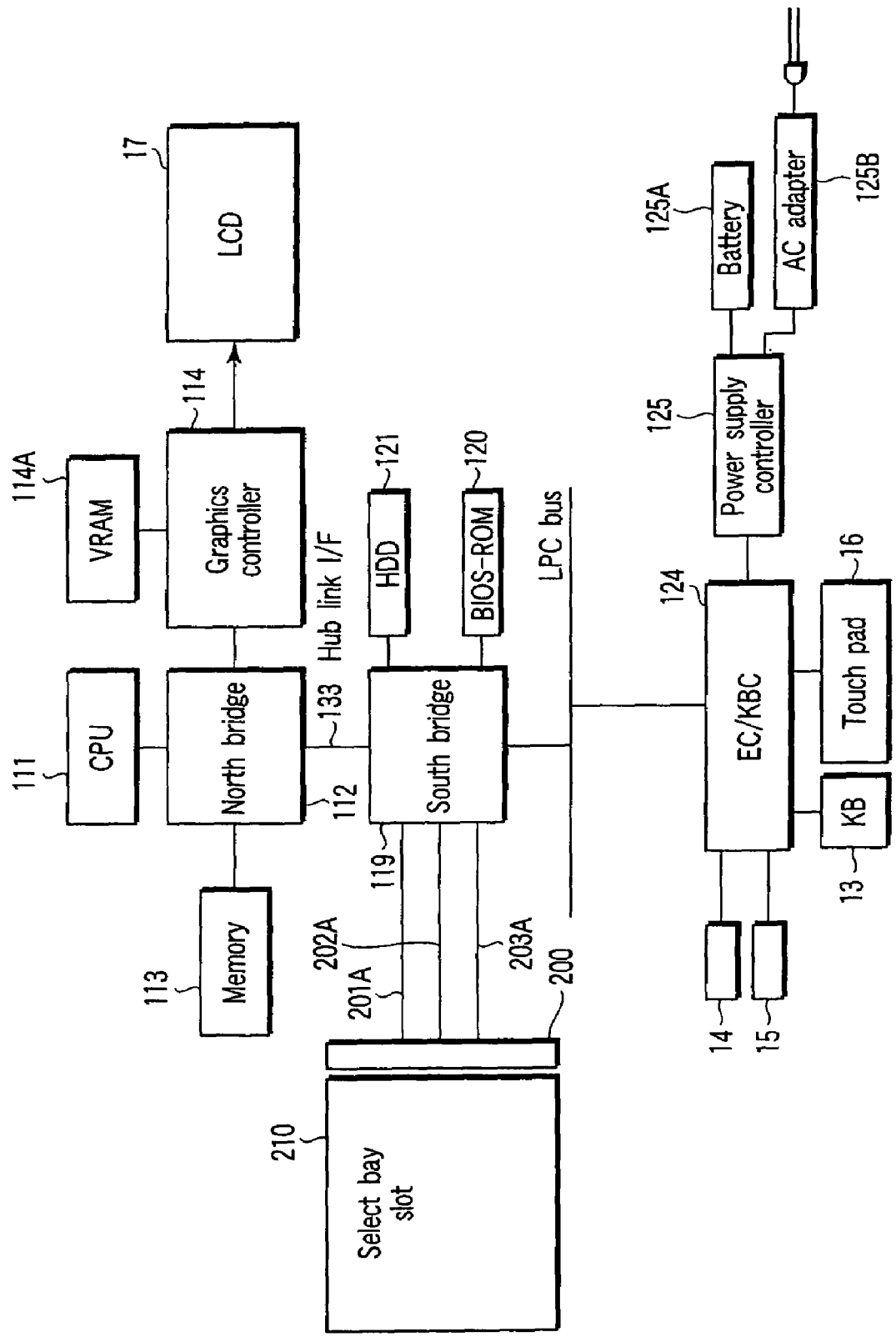
F I G. 2

| No | Signal name | No | Signal name |
|----|-------------|----|-------------|
| 74 | 5V | 37 | IDE6 |
| 73 | 5V | 36 | IDE7 |
| 72 | 3V | 35 | GND |
| 71 | 3V | 34 | GND |
| 70 | 3V | 33 | IDE8 |
| 69 | 3V | 32 | IDE9 |
| 68 | 3V | 31 | IDE10 |
| 67 | 3V | 30 | IDE11 |
| 66 | 3V | 29 | GND |
| 65 | 3V | 28 | GND |
| 64 | NC | 27 | IDE12 |
| 63 | NC | 26 | IDE13 |
| 62 | Status 1 | 25 | IDE14 |
| 61 | Status 2 | 24 | IDE15 |
| 60 | Status 3 | 23 | IDE16 |
| 59 | GND | 22 | GND |
| 58 | GND | 21 | GND |
| 57 | SATA1 | 20 | GND |
| 56 | GND | 19 | IDE17 |
| 55 | SATA2 | 18 | IDE18 |
| 54 | GND | 17 | IDE19 |
| 53 | GND | 16 | IDE20 |
| 52 | GND | 15 | IDE21 |
| 51 | SATA3 | 14 | IDE22 |
| 50 | GND | 13 | GND |
| 49 | SATA4 | 12 | GND |
| 48 | GND | 11 | IDE23 |
| 47 | GND | 10 | IDE24 |
| 46 | USB1 | 9 | IDE25 |
| 45 | USB2 | 8 | IDE26 |
| 44 | GND | 7 | IDE27 |
| 43 | GND | 6 | GND |
| 42 | IDE1 | 5 | IDE28 |
| 41 | IDE2 | 4 | GND |
| 40 | IDE3 | 3 | GND |
| 39 | IDE4 | 2 | GND |
| 38 | IDE5 | 1 | GND |

F I G. 4

| No | Signal name | No | Signal name |
|---|---|---|---|
| 72 | 5V | 71 | 5V |
| 2 | NC | 1 | NC |
| 4 | NC | 3 | NC |
| 6 | NC | 5 | NC |
| 8 | NC | 7 | NC |
| 10 | Status 2 | 9 | Status 1 |
| 12 | GND | 11 | Status 3 |
| 14 | NC | 13 | GND |
| 16 | NC | 15 | GND |
| 18 | GND | 17 | GND |
| 20 | NC | 19 | GND |
| 22 | NC | 21 | GND |
| 24 | GND | 23 | GND |
| 26 | NC | 25 | NC |
| 28 | GND | 27 | GND |
| 30 | IDE2 | 29 | IDE1 |
| 32 | IDE4 | 31 | IDE3 |
| 34 | IDE6 | 33 | IDE5 |
| 36 | GND | 35 | IDE7 |
| 38 | IDE8 | 37 | GND |
| 40 | IDE10 | 39 | IDE9 |
| 42 | GND | 41 | IDE11 |
| 44 | IDE12 | 43 | GND |
| 46 | IDE14 | 45 | IDE13 |
| 48 | IDE16 | 47 | IDE15 |
| 50 | GND | 49 | GND |
| 52 | GND | 51 | GND |
| 54 | IDE17 | 53 | GND |
| 56 | IDE19 | 55 | IDE18 |
| 58 | IDE21 | 57 | IDE20 |
| 60 | GND | 59 | IDE22 |
| 62 | IDE23 | 61 | GND |
| 64 | IDE25 | 63 | IDE24 |
| 66 | IDE27 | 65 | IDE26 |
| 68 | IDE28 | 67 | GND |
| 70 | GND | 69 | GND |
| 74 | GND | 73 | GND |

| No | Signal name | No | Signal name |
|---|---|---|---|
| 72 | 5V | 71 | 5V |
| 2 | 3V | 1 | 3V |
| 4 | 3V | 3 | 3V |
| 6 | 3V | 5 | 3V |
| 8 | 3V | 7 | 3V |
| 10 | Status 2 | 9 | Status 1 |
| 12 | GND | 11 | Status 3 |
| 14 | SATA1 | 13 | GND |
| 16 | SATA2 | 15 | GND |
| 18 | GND | 17 | GND |
| 20 | SATA3 | 19 | GND |
| 22 | SATA4 | 21 | GND |
| 24 | GND | 23 | GND |
| 26 | NC | 25 | NC |
| 28 | GND | 27 | GND |
| 30 | NC | 29 | NC |
| 32 | NC | 31 | NC |
| 34 | NC | 33 | NC |
| 36 | GND | 35 | NC |
| 38 | NC | 37 | GND |
| 40 | NC | 39 | NC |
| 42 | GND | 41 | NC |
| 44 | NC | 43 | GND |
| 46 | NC | 45 | NC |
| 48 | NC | 47 | NC |
| 50 | GND | 49 | GND |
| 52 | GND | 51 | GND |
| 54 | NC | 53 | GND |
| 56 | NC | 55 | NC |
| 58 | NC | 57 | NC |
| 60 | GND | 59 | NC |
| 62 | NC | 61 | GND |
| 64 | NC | 63 | NC |
| 66 | NC | 65 | NC |
| 68 | NC | 67 | GND |
| 70 | GND | 69 | GND |
| 74 | GND | 73 | GND |

INFORMATION PROCESSING APPARATUS AND METHOD FOR CONTROLLING THE SAME

CROSS-REFERENCE TO RELATED APPLICATIONS

This application is based upon and claims the benefit of priority from Japanese Patent Application No. 2005-160350, filed May 31, 2005, the entire contents of which are incorporated herein by reference.

BACKGROUND

1. Field

One embodiment of the invention relates to information processing apparatus in which a removable device is installed, and a method for controlling the information processing apparatus.

2. Description of the Related Art

Integrated drive electronics (IDE) are widely used for storage devices such as hard disk drives and optical disc drives which are mounted in personal computers or the like. In accordance with the IDE, communications are carried out on the basis of a parallel scheme using 40 signal lines.

In accordance with the IDE, a user must set the storage device so that it can operate either as a master or as a slave. The use of 40 signal lines for communication requires wider cables. In recent years, cables in conformity with the IDE have been obstacles to air flows used to discharge heat from a housing of a personal computer to the exterior.

Serial advanced technology attachment (ATA) have been proposed in order to solve this problem. Storage devices in conformity with the ATS standards are now prevailing. The serial ATA do not involve the master and slave concept for the storage device; they do not require the storage device to be set to operate either as a master or as a slave. Further, in accordance with the serial ATA, communications are carried out on the basis of a serial scheme using seven signal lines. This allows a reduction in the thickness of the cables.

Some notebook type personal computers can execute expanded functions by providing plural types of expansion bays that can be removably installed in a select bay slot formed in the body. Devices mounted in the expansion bays include an optical disc drive, a hard disc drive, and a TV tuner.

As described above, the two sets of standards, the IDE and the serial ATA, are currently used for the storage devices. It is thus expected that storage devices in conformity with the IDE and serial ATA are mounted in the expansion bay. Jpn. Registered UM Publication No. 3093782 discloses a technique for a connector for connection of an expansion bay that supports the two sets of standards.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing the configuration of a system in the personal computer shown in FIG. 1;

FIG. 4 is an exemplary diagram showing assignment of signal pins provided on an expansion connector;

FIG. 10 is an exemplary diagram showing assignment of pins on a relay board provided in an S-ATA expansion bay and to which the connector engaging with the expansion connector is connected;

DETAILED DESCRIPTION

Various embodiments according to the invention will be described hereinafter with reference to the accompanying drawings. In general, according to one embodiment of the invention, an information processing apparatus comprises a body, a bay portion provided in the body and in which a one of a first device having a first relay board and a second device having a second relay board is removably inserted, a first controller which communicates with the first device, a second controller which communicates with the second device, a connector provided in the bay portion and connected to the first relay board or the second relay board, and including a plurality of first signal pins connected to the first controller via a first bus, a plurality of second signal pins connected to the second controller via a second bus, two ground pins connected to a common ground, a first power supply pins and a second power supply pins, and one of the second signal pins locates between the two ground pins, and a power supply controller configure to supply a first power supply voltage via the first power supply pins to the first device when the second device inserted in the bay portion, and to supply a second power supply voltage via the second power supply pins to the second device when the second device is inserted in the bay portion.

Figure 1:
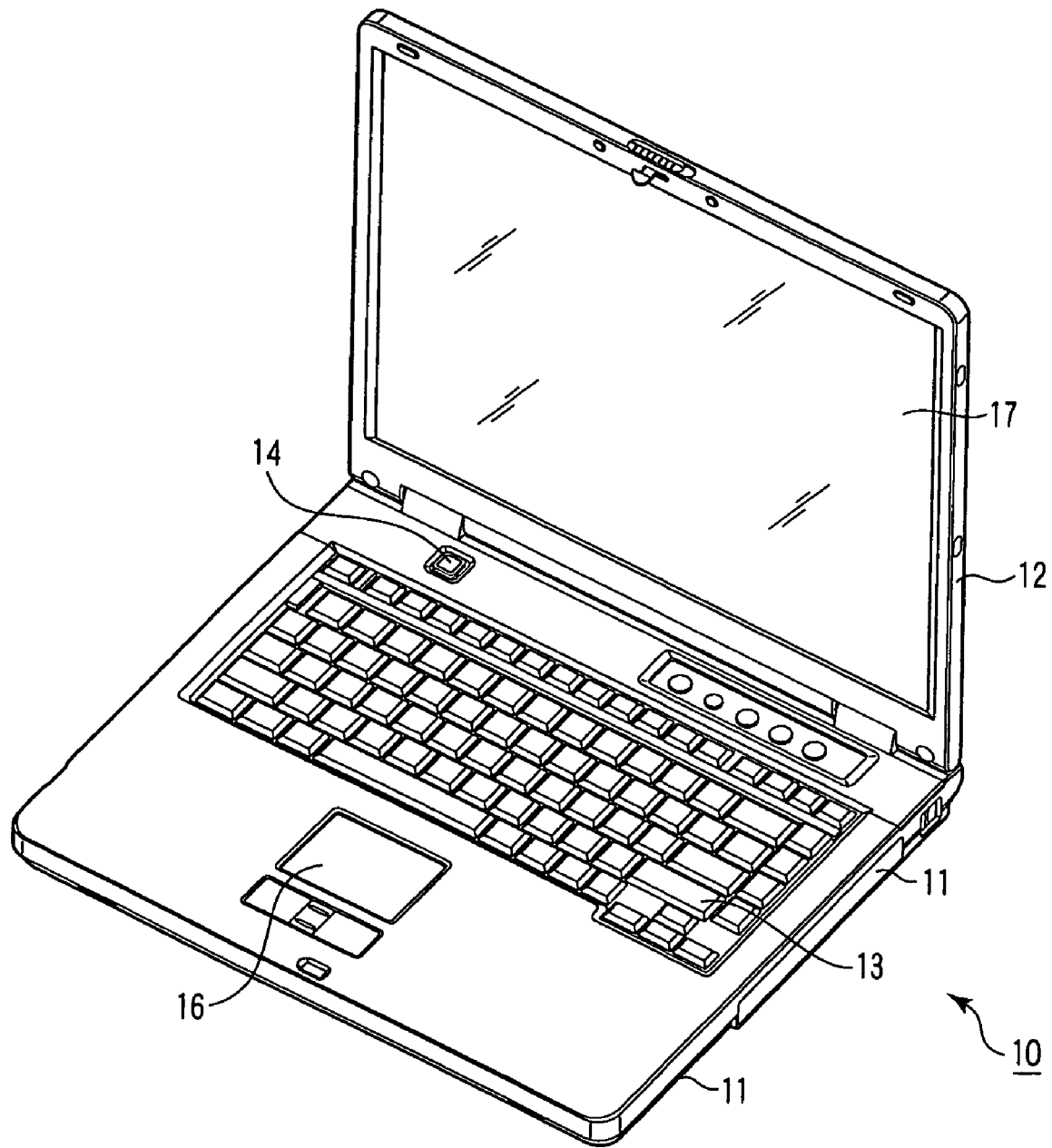
FIG. 1 is an exemplary diagram showing the configuration of a notebook type personal computer serving as an information processing apparatus in accordance with an embodiment of the present invention.

With reference to FIGS. 1 and 2, description will be given of the configuration of an information processing apparatus in accordance with an embodiment of the present invention. This information processing apparatus is implemented as a battery-driven, portable notebook type personal computer 10.

FIG. 1 is a perspective view showing that a display unit of the notebook type personal computer 10 is open. The computer 10 is composed of a computer body 11 and the display unit 12. A display panel composed of Liquid Crystal Display (LCD) 17 and a backlight is integrated into the display unit 12. A display screen of LCD 17 is located almost in the center of the display unit 12.

The display unit 12 is supported by the computer body 11. The display unit 12 is attached to the computer body 11 so as to be rotatively movable between an open position in which a top surface of the computer body 11 is exposed and a closed position in which the top surface of the computer body 11 is covered with the display unit 12. The computer body 11 has a housing shaped like a thin box having a keyboard 13, a power button 14 used to power on and off the computer 10, a touch pad 16, and the like.

A select bay slot is formed in a side of the computer body 11. A corresponding expansion bay incorporating a device can be installed in and removed from the select bay slot. Examples of the device corresponding to the select bay switch include a hard disc drive, an optical disc drive, and a TV tuner.

Now, the system configuration of the computer 10 will be described with reference to FIG. 2.

As shown in FIG. 2, the computer 10 comprises CPU 111, a north bridge 112, a main memory 113, a graphics controller 114, a south bridge 119, BIOS-ROM 120, a hard disc drive (HDD) 121, an embedded controller/keyboard controller IC (EC/KBC) 124, and a power supply controller 125.

CPU 111 is a processor that controls operations of the computer 10. CPU 111 executes an operating system (OS) and various application programs which are loaded from the hard disc drive (HDD) 121 into the main memory 113.

CPU 111 executes BIOS (Basic Input Output System) stored in BIOS-ROS 120. BIOS is a program that controls hardware.

The north bridge 112 is a bridge device that connects a local bus in CPU 111 to the south bridge 119. The north bridge 112 incorporates a memory controller that controls accesses to the main memory 113. The north bridge 112 also has a function for communicating with the graphics controller 114 via an accelerated graphics port (AGP) bus or the like.

The graphics controller 114 is a display controller that controls LCD 17, used as a display monitor of the computer 10. The graphics controller 114 has a video memory (VRAM) 114A and generates, from display data written to the video memory 114A by the OS/application program, a video signal that forms a display image to be displayed on LCD 17 of the display unit 12.

The south bridge 119 controls the devices on an LPC (Low Pin Count) bus. The south bridge 119 also incorporates an IDE controller that supports the integrated drive electronics (IDE). The IDE controller is connected to an expansion connector 200 via an IDE bus 201A. The IDE controller communicates with HDD 121 that supports the IDE. The IDE controller communicates, via the IDE bus 201A, with a device installed in the expansion connector and supporting the IDE.

The south bridge 119 incorporates an S-ATA controller that supports the serial ATA (S-ATA) standards. The S-ATA controller is connected to the expansion connector 200 via a serial ATA bus 202A. The S-ATA controller communicates, via the S-ATA bus 202A, with a device installed in the expansion connector and supporting the S-ATA.

The south bridge 119 incorporates a USB controller that supports universal serial bus (USB). The USB controller is connected to the expansion connector 200 via a USB bus 203A. The USB controller communicates, via the USB bus 203A, with a device installed in the expansion connector and supporting the USB standards.

The south bridge 119 further has a function for controlling accesses to BIOS-ROM 120.

The embedded controller/keyboard controller IC (EC/KBC) 124 is a one-chip microcomputer in which an embedded controller and a keyboard controller are stacked; the embedded controller manages power and the keyboard controller controls the keyboard (KB) 13 and the touch panel 16. The embedded controller/keyboard controller IC (EC-KBC) 124 has a function for cooperating with the power supply controller 125 in powering on and off the computer 10 in response to an operation of the power button 14.

Figure 3:
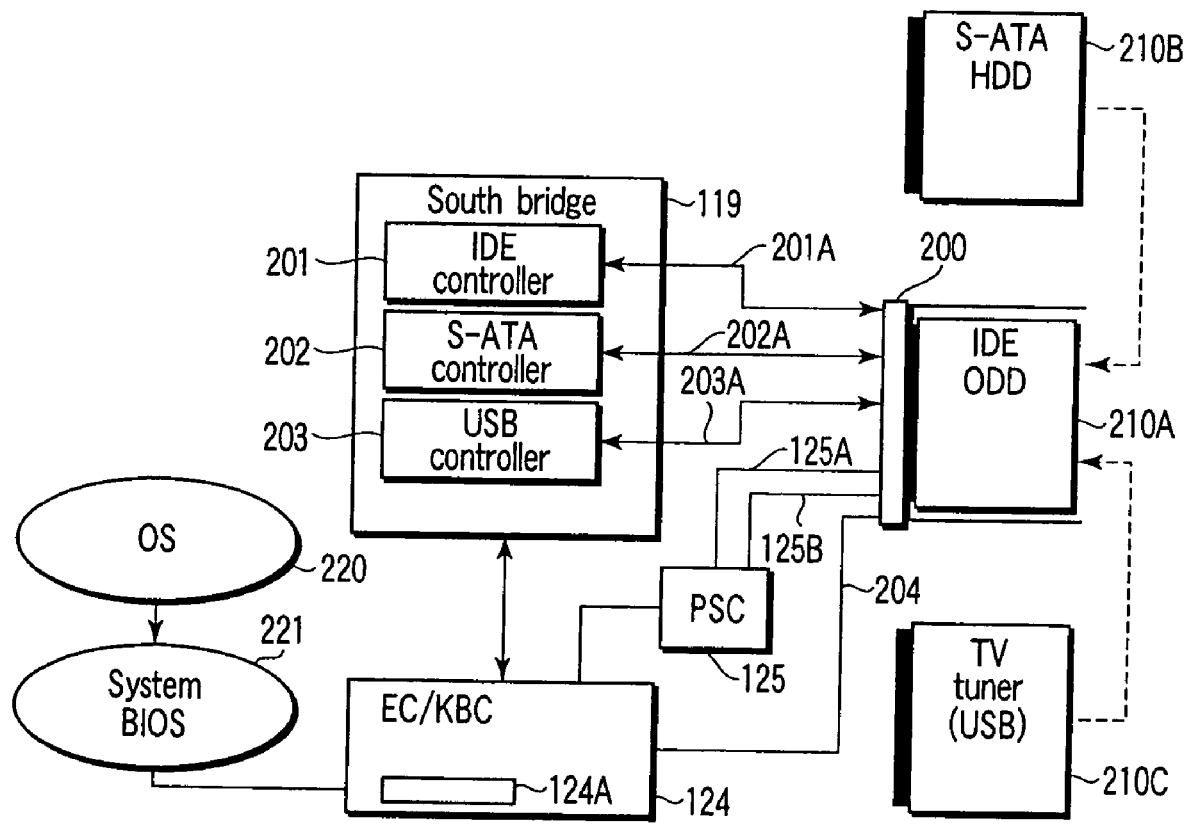
FIG. 3 is an exemplary block diagram showing an example of a group of disc controllers incorporated into a south bridge.

Now, description will be given of an ATA control group incorporated into the south bridge 119. FIG. 3 is a block diagram showing an example of a disc controller group incorporated into the south bridge 119.

The south bridge 119 incorporates an IDE controller 201 that supports the IDE, an S-ATA controller 202 that supports the S-ATA, and a USB controller 203 that supports the USB standards.

The IDE controller 201 is connected to the expansion connector 200 via the IDE bus 201A. The S-ATA controller 202 is connected to the expansion connector 200 via the S-ATA bus 202A. The USB bus 203 is connected to the expansion connector 200 via the USB bus 203A.

The expansion connector 200 can connect to an IDE expansion bay 210A incorporating, for example, an optical disc drive (IDE ODD) that supports the IDE. When the IDE expansion bay 210A is installed, the IDE expansion bay 210A and the IDE controller 201 communicate via the IDE bus 201A. The IDE expansion bay 210A may incorporate a hard disc drive that supports the IDE, instead of the optical disc.

The expansion connector 200 can connect to an S-ATA expansion bay 210B incorporating, for example, a hard disc drive (S-ATA HDD) that supports the S-ATA. When the S-ATA expansion bay 210B is installed, the S-ATA expansion bay 210B and the S-ATA controller 202 communicate via the S-ATA bus 202A. The S-ATA expansion bay 210B may incorporate an optical disc drive that supports the S-ATA, instead of the hard disc drive.

The expansion connector 200 can connect to a USB expansion bay 210C incorporating, for example, a TV tuner that supports the USB standards. When the USB expansion bay 210C is installed, the USB expansion bay 210C and the USB controller 203 communicate via the USB bus 203A.

The IDE expansion bay 210A, S-ATA expansion bay 210B, and USB expansion bay 210C are connected to the expansion connector 200 by inserting them into the select bay slot 210.

EC/KBC 124 is connected to the expansion connector 200 via a status bus 204 including a plurality of signal lines. EC/KBC 124 reads the voltage value of each signal line in the expansion connector 200 to detect the type of a device connected to the select bay slot 210. In addition to the communication standards supported by the device, EC/KBC 124 detect, if the IDE expansion bay 210A or S-ATA expansion bay 210B is connected to the expansion connector 200, whether a hard disc drive or an optical disc drive is incorporated into the expansion bay.

The power supply controller 125 is connected to EC/KBC 124. The power supply controller 125 supplies a power supply voltage to the device connected to the expansion connector. Power supply voltages of 5 V and 3.3 V from the power supply controller 125 can be supplied to the device connected to the expansion connector. The power supply controller 125 supplies the power supply voltage of 5 V via a power supply voltage supply line 125A. The power supply controller 125 supplies the power supply voltage of 3.3 V via a power supply voltage supply line 125B. EC/KBC 124 writes the detected device type to a register 124A to control the power supply voltage supplied to the expansion connector 200 depending on the type.

FIG. 4 shows assignment of signal pins provided on the expansion connector 200. As shown in FIG. 4, pin nos. 73 and 74 (5 V) are connected to the power supply voltage supply line 125A. Pin nos. 65 to 72 (3 V) are connected to the power supply voltage supply line 125B. Pin nos. 60 to 63 serving as status signal pins (statuses 1 to 3) are connected to the expansion connector 200 via the status bus 204. Pin nos. 49, 51, 55, and 57 (SATA1 to SATA4) are connected to the serial ATA controller 202 via the S-ATA bus 202A. Pin nos. 45 and 46 (USB 1 and USB2) are connected to the USB controller 203 via the USB 203A. Pin nos. 5, 7 to 11, 14 to 19, 23 to 27, 30 to 33, and 36 to 42 (PATA1 to PATA28) are connected to the IDE controller 201 via the IDE bus 201A. In FIG. 4, GND denotes ground pins connected to a common ground.

As shown in the assignment of the pins on the expansion connector 200, interface signals S-ATA, IDE, and USB are assigned to independent signal pins. The power supply and ground are appropriately shared by the interfaces taking the adverse effect of noise into account.

Figures 5, 6:
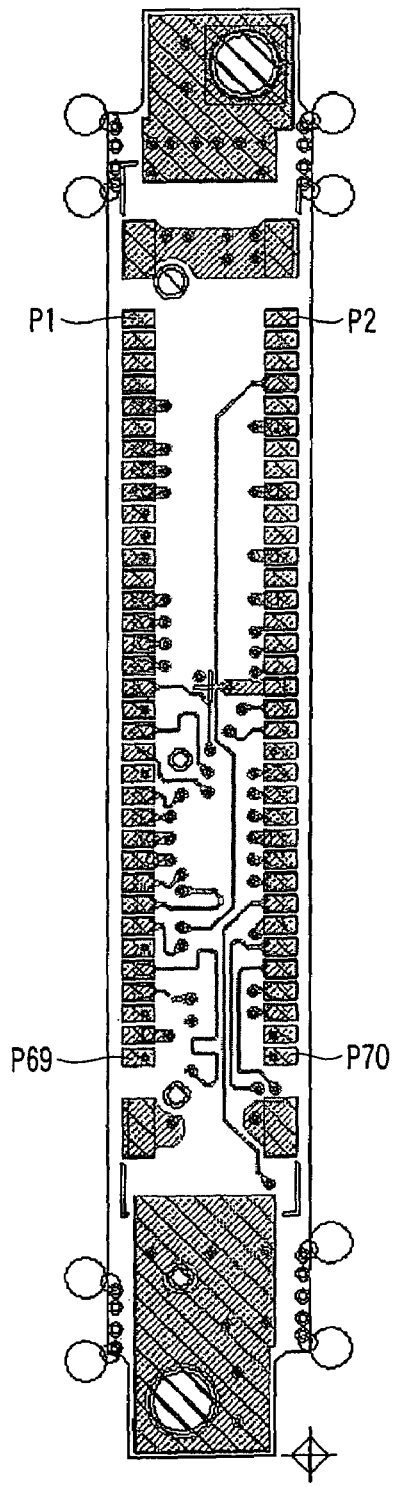
FIG. 5 is an exemplary diagram showing assignment of signal pins on a relay board provided in an IDE expansion bay and to which a connector engaging with the expansion connector is connected.
FIG. 6 is an exemplary diagram showing the wiring layout of a side of the relay board in the IDE expansion bay which is provided with the connector engaging with the expansion connector.
Figure 7:
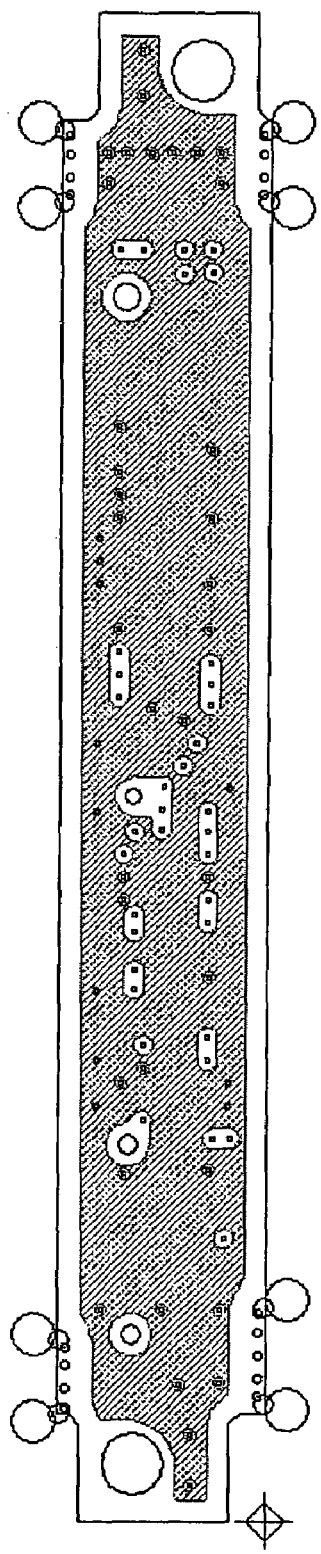
FIG. 7 is an exemplary diagram showing the wiring layout of a layer lying under the wiring layout shown in FIG. 6.
Figure 8:
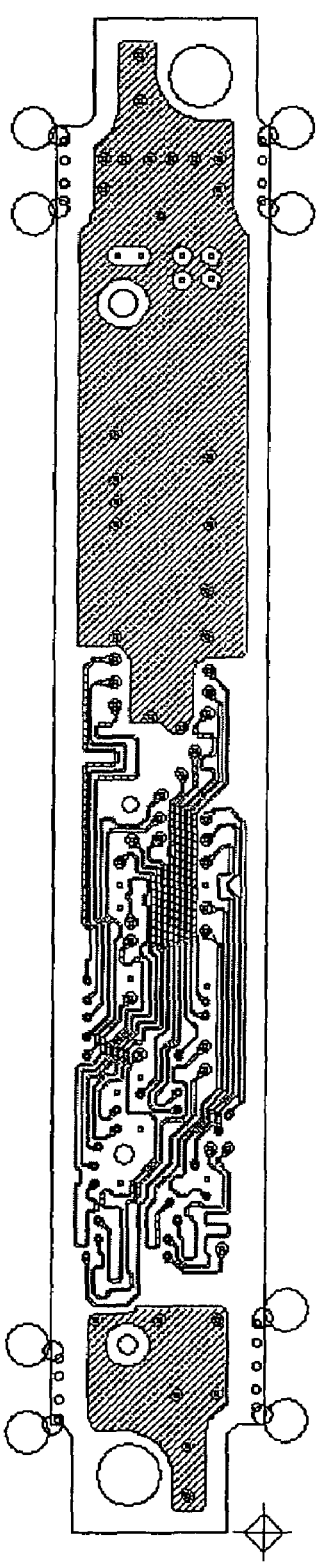
FIG. 8 is an exemplary diagram showing a wiring layout of a layer lying under the wiring layout shown in FIG. 7.
Figure 9:
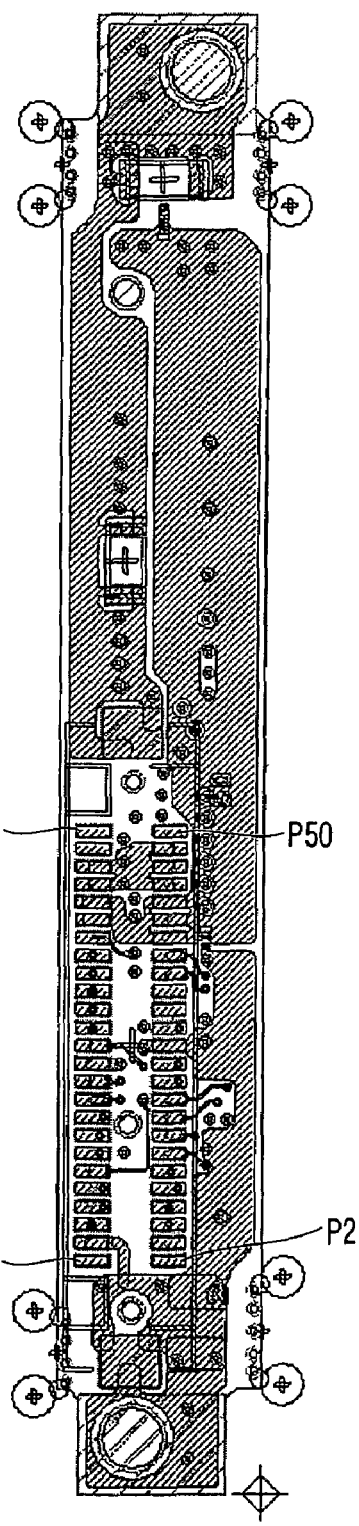
FIG. 9 is an exemplary diagram showing the wiring layout of a side of the relay board which is provided with a connector to connect to the IDE expansion device.

FIG. 5 shows assignment of signal pins on a relay board provided in the IDE expansion bay 210A and to which a connector engaging with the expansion connector 200 is connected. FIGS. 6, 7, 8, and 9 show the wiring layout of the relay board provided in the IDE expansion bay. FIG. 6 shows the wiring layout of a side of the relay board which is provided with the connector engaging with the expansion connector. FIG. 7 shows the wiring layout of a layer lying under the wiring layout shown in FIG. 6. FIG. 8 shows the wiring layout of a layer lying under the wiring layout shown in FIG. 7. FIG. 9 shows the wiring layout of a side of the relay board which is provided with a connector to connect to an IDE device.

Figure 11:
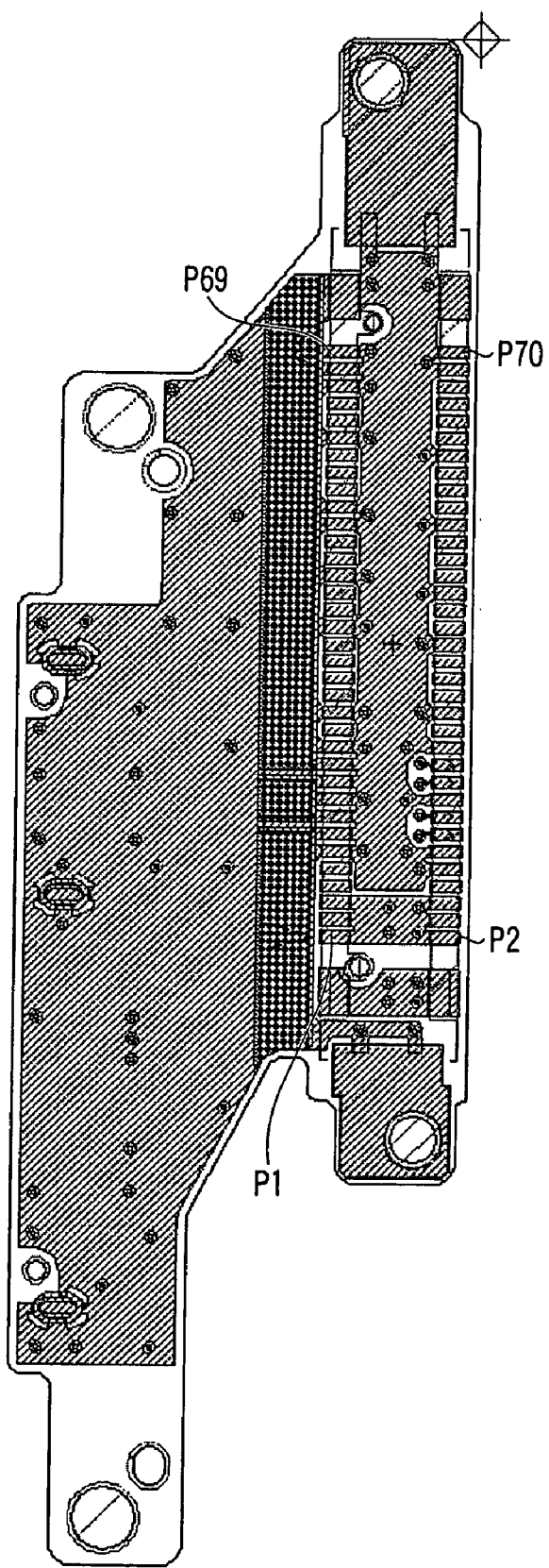
FIG. 11 is an exemplary diagram showing the wiring layout of a side of the relay board in the S-ATA expansion bay which is provided with a connector connecting to the expansion connector.
Figure 12:
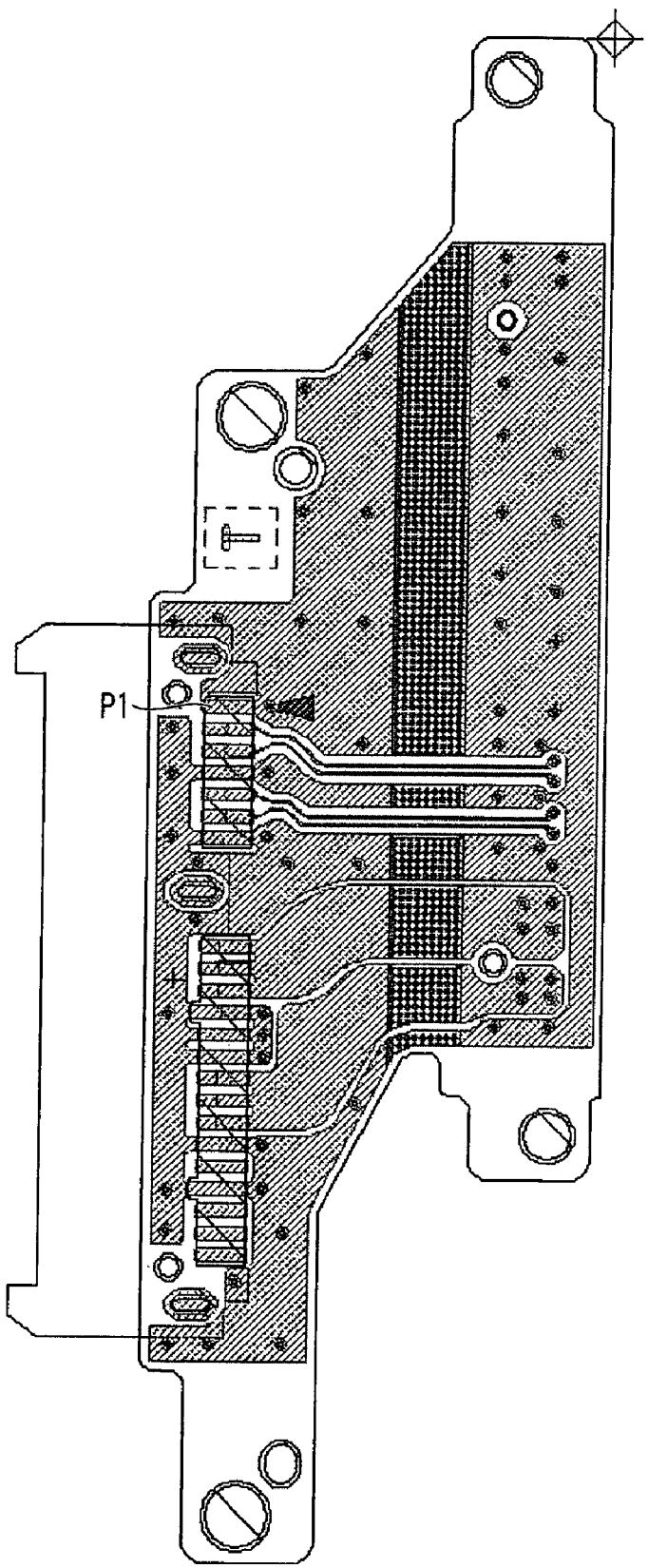
FIG. 12 is an exemplary diagram showing the wiring layout of a side of the relay board in the IDE expansion bay which is provided with a connector connecting to an IDE device connector.

FIG. 10 shows assignment of pins on a relay board provided in the S-ATA expansion bay 210B and to which a connector engaging with the expansion connector 200 is connected. In FIG. 10, NC denotes signal pins connecting to nothing. FIGS. 11 and 12 show the wiring layout of the relay board provided in the S-ATA expansion bay. FIG. 11 shows the wiring layout of a side of the relay board which is provided with the connector engaging with the expansion connector. FIG. 12 shows the wiring layout of a side of the relay board which is provided with a connector to connect to an S-ATA device.

Owing to the high speeds of interface signals in conformity with the S-ATA, the ground pins are arranged on the opposite sides of the data signal pins (SATA1 to SATA4) as shown in FIGS. 4 and 10. Owing to the high speeds of SATA interface signals, the wiring layout of the relay board is such that the length of the wiring for data signals is minimized between the connector connected to the device and the connector connected to the PC body and such that data signal lines have an impedance of 100 Ω.

The type of the device mounted in the select bay can be detected by a signal ("High" or "Low") supplied to EC/KBC 124 via status signal pins 1 to 3 by a status circuit provided on the relay board. Detection of the device type enables the selection of a signal and a power supply used for the device mounted in the select bay. This eliminates the need to change, for example, the assignment of the pins in the select bay interface connector in the PC body.

Table 1 shows the correspondences between the status signals 1 to 3 and connected devices.

TABLE 1

| Status 1 | Status 2 | Status 3 | Device |
|---|---|---|---|
| High | High | Low | IDE ODD |
| High | Low | High | S-ATA ODD |
| High | Low | Low | IDE HDD |
| Low | High | Low | USB |
| Low | Low | High | S-ATA HDD |

Figure 13:
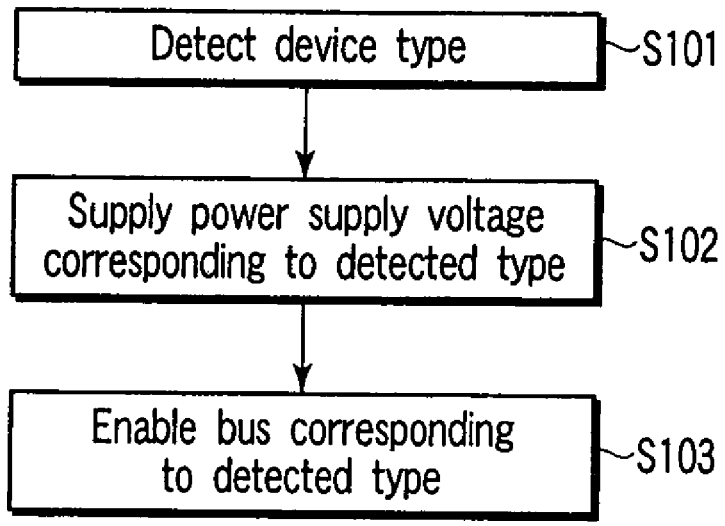
FIG. 13 is an exemplary flowchart showing a process procedure executed if an expansion bay has been installed in a select bay slot.

Now, with reference to a flowchart in FIG. 13, description will be given of a process procedure executed if an expansion bay has been installed in the select bay slot 210. With reference to a flowchart in FIG. 14, description will also be given of a process procedure executed if the expansion bay is to be removed from the select bay slot 210.

First, with reference to the flowchart in FIG. 13, description will be given of the flow of the process executed if the S-ATA expansion bay 210B has been installed in the select bay slot 210.

When the S-ATA expansion bay 210B is inserted into the select bay slot 210, a plurality of dedicated status signals (pin nos. 60 to 62 in FIG. 4) are supplied to EC/KBC 124 via the status bus 204; the status signals are assigned to the expansion connector 200 in the body.

EC/KBC 124 detects the type of the device (in this case, S-ATA HDD) inserted in the select bay slot 210, on the basis of the voltages in the plurality of dedicated status signals (step S101). EC/KBC 124 instructs the power supply controller 125 to supply the two power supply voltages, 5 V and 3.3 V, to the expansion connector 200. The device installed in the select bay switch 210 is thus supplied with power (step S102).

EC/KBC 124 subsequently notifies BIOS 221 that an S-ATA device has been installed in the select bay slot 210. BIOS 221 instructs the south bridge 119 to enable the S-ATA bus 202A so that the S-ATA expansion bay 210B and S-ATA controller 202 can communicate (step S103). BIOS 221 also notifies the operating system 220 that the S-ATA device has been installed in the select bay slot 210. BIOS 221 subsequently resets and enables the S-ATA expansion bay 210B.

Figure 14:
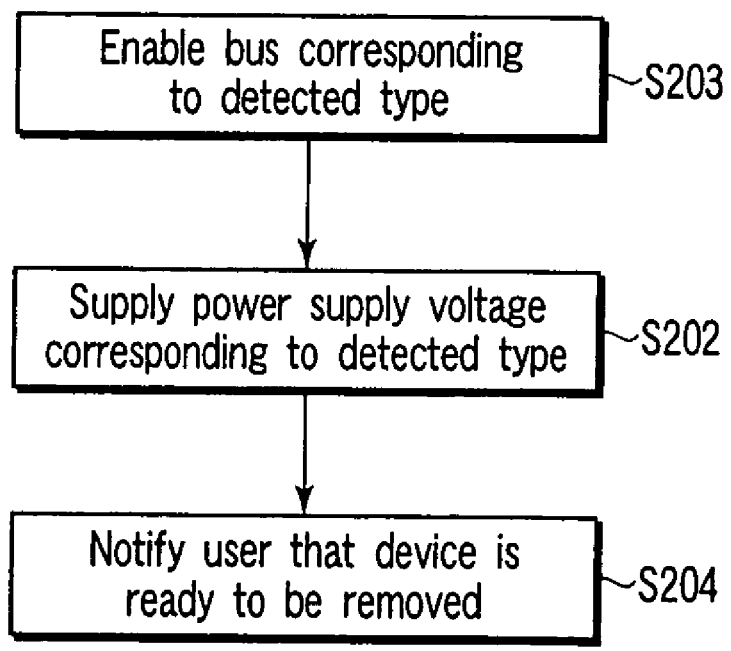
FIG. 14 is an exemplary flowchart showing a process procedure executed if the expansion bay is to be removed from the select bay slot.

With reference to FIG. 14, description will be given of the case where the S-ATA expansion bay 210B is to be removed.

When the user uses the operating system 220 to execute a process for removing the device installed in the select bay slot 210, the operating system 220 notifies BIOS 221 that the device installed in the select bay slot 210 is to be removed. Upon reception of this notification, BIOS 221 reads information written to the register 124A to detect the type of the device (in this case, S-ATA HDD) installed in the select bay slot 210. Upon recognizing that the device is S-ATA HDD, BIOS 221 instructs the S-ATA controller 202 in the south bridge 119 to disable the S-ATA bus 202A to stop the communication between the S-ATA controller 202 and the S-ATA expansion bay 210B (step S202).

When the S-ATA bus 202A is disabled, the S-ATA controller 202 notifies BIOS 221 that the S-ATA bus 202A has been disabled. Upon reception of this notification, BIOS 221 instructs the supply of the power supply voltage to the expansion connector 200 to be stopped. Upon reception of this notification, EC/KBC 124 references the information in the register 124A to detect the type of the power supply voltage being supplied to the expansion connector 200. EC/KBC 124 thus stops the supply of the power supply voltages of 3.3 V and 5 V (step S203). Upon stoppage of supply of the power supply voltages, EC/KBC 124 notifies BIOS 221 that the supply of the power supply voltages has been stopped. Upon reception of this notification, BIOS 221 notifies the operating system 220 that the S-ATA expansion bay 210B is ready to be removed. The operating system 220 notifies the user that the S-ATA expansion bay 210B is ready to be removed (step S204).

Now, with reference to FIG. 13, description will be given of the flow of a process executed if the IDE expansion bay 210A has been installed in the select bay slot 210.

When the IDE expansion bay 210A is inserted into the select bay slot 210, a plurality of dedicated status signals (pin nos. 60 to 62 in FIG. 4) are supplied to EC/KBC 124 via the status bus 204; the status signals are assigned to the expansion connector 200 in the body.

EC/KBC 124 detects the type of the device (in this case, IDE HDD) mounted in the select bay slot 210, on the basis of the voltages in the plurality of dedicated status signals (step S101). EC/KBC 124 instructs the power supply controller 125 to supply the single power supply voltage, 5 V, to the expansion connector 200. The device installed in the select bay switch 210 is thus supplied with power.

EC/KBC 124 subsequently notifies BIOS 221 that an IDE device has been installed in the select bay slot 210. BIOS 221 instructs the south bridge 119 to enable the IDE bus 201A so that the IDE expansion bay 210A and IDE controller 201 can communicate. BIOS 221 also notifies the operating system 220 that the IDE device has been installed in the select bay slot 210. BIOS 221 subsequently resets and enables the IDE expansion bay 210A.

With reference to FIG. 14, description will be given of the case where the IDE expansion bay 210A is to be removed.

When the user uses the operating system 220 to execute a process for removing the device installed in the select bay slot 210, the operating system 220 notifies BIOS 221 that the device installed in the select bay slot 210 is to be removed. Upon reception of this notification, BIOS 221 reads information written to the register 124A to detect the type of the device (in this case, IDE ODD) installed in the select bay slot 210. Upon recognizing that the device is IDE ODD, BIOS 221 instructs the S-ATA controller 202 in the south bridge 119 to disable the IDE bus 201A to stop the communication between the IDE controller 201 and the IDE expansion bay 210A.

Once the IDE bus 201A is successfully disabled, the IDE controller 201 notifies BIOS 221 that the IDE bus 201A has been disabled. Upon reception of this notification, BIOS 221 notifies EC/KBC124 that the IDE bus 201A has been disabled. Upon reception of this notification, EC/KBC 124 references the information in the register 124A to detect the type of the power supply voltage being supplied to the expansion connector 200. EC/KBC 124 instructs the power supply controller 125 to stop the supply of the power supply voltage of 5 V to the expansion connector 200. Upon stoppage of supply of the power supply voltages, EC/KBC 124 notifies BIOS 221 that the supply of the power supply voltage has been stopped. Upon reception of this notification, BIOS 221 notifies the operating system 220 that the IDE expansion bay 210A is ready to be removed. The operating system 220 notifies the user that the IDA expansion bay 210A is ready to be removed.

The power supply can be turned on and off by the control from the body, thus enabling hot swapping of the device (enabling the device mounted in the select bay to be removed and replaced without the need to power off the body).

The personal computer in accordance with the present embodiment enables the appropriate arrangement of the signal pins for high-speed communications in conformity with the S-ATA. This facilitates the design of the relay board connected to the signal pins. A stable communication speed can thus be achieved with the adverse effect of noise suppressed.

The status signal enables the type of the device installed in the select bay slot to be automatically determined. This makes it possible to enable the bus in the body required for connection of the device to select one of the S-ATA, IDE, and USB signals.

Further, the S-ATA, IDE, and USB pins are independently provided, enabling the connection of a device comprising a composite interface such as SATA+PATA, PATA+USB, or SATA+USB.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a body;
a bay portion provided in the body and in which a one of a first device having a first relay board and a second device having a second relay board is removably inserted;
a first controller which communicates with the first device;
a second controller which communicates with the second device;
a connector provided in the bay portion and connected to the first relay board or the second relay board, and including a plurality of first signal pins connected to the first controller via a first bus, a plurality of second signal pins connected to the second controller via a second bus, two ground pins connected to a common ground, a first power supply pins and a second power supply pins, and one of the second signal pins locates between the two ground pins; and
a power supply controller configure to supply a first power supply voltage via the first power supply pins to the first device when the second device inserted in the bay portion, and to supply a second power supply voltage via the second power supply pins to the second device when the second device is inserted in the bay portion.

2. An information processing apparatus comprising:
a body;
a bay portion provided in the body and in which a one of a first device having a first relay board and a second device having a second relay board is removably inserted;
a first controller which communicates with the first device;
a second controller which communicates with the second device;
a connector provided in the bay portion and connected to the first relay board or the second relay board, and including a plurality of first signal pins connected to the first controller via a first bus, a plurality of second signal pins connected to the second controller via a second bus, two ground pins connected to a common ground, one of the second signal pins locates between the two ground pins, a first power supply pins and a second power supply pins, and a status signal pins, and the connector being configured to be connected to one of the first relay board and second relay board;
a power supply controller configure to supply a first power supply voltage via the first power supply pins to the first device when the second device inserted in the bay portion, and to supply a second power supply voltage via the second power supply pins to the second device when the second device is inserted in the bay portion;
a detection portion which detects the type of the device inserted in the bay portion in accordance with a signal supplied via a status signal pins by a inserted device which being one of the first device and the second device inserted in the bay portion; and
a first instructing portion which instructs one of the first controller and second controller to communicate with the inserted device, and instructs the power supply controller to supply the power supply voltage, in accordance with the type of the device detected by the detection portion, when one of the first device and the second device is inserted in the bay portion.

3. The information processing apparatus according to claim 2, further comprising a second instructing portion which instructs one of the first controller and the second controller which the inserted device to prohibit communication with the inserted device, and instructs the power supply controller to stop the supply of the power supply voltage to the power supply pins in accordance with the type of the device detected by the detection portion, when user execute a process for removing the in the bay portion.

4. The information processing apparatus according to claim 2, wherein the first device and the first controller supports advanced technology attachment.

5. The information processing apparatus according to claim 2, wherein the second device and the second controller supports serial advanced technology attachment.

6. The information processing apparatus according to claim 2, further comprising third controller,
wherein a third device which communicates with the third controller is inserted in the bay portion and removed from bay portion, and
the connector is provided with third signal pins connected to the third controller via a third bus.

7. The information processing apparatus according to claim 6, wherein the third device and the third controller supports universal serial bus (USB).

8. A method for controlling an information processing apparatus having a bay portion provided in a body and in which a one of a first device having a first relay board and a second device having a second relay board which is a removable device is inserted, a first controller which communicates with the first device, a second controller which communicates with the second device, a connector provided in the bay portion and including a plurality of first signal pins connected to the first controller via a first bus, a plurality of second signal pins connected to the second controller via a second bus, a plurality of ground pins connected to a common ground and which sandwich a selected one of the second signal pins between the ground pins, a first power supply pins and a second power supply pins, and a status signal pins, and the connector being configured to be connected to one of the first relay board and second relay board, a power supply controller configure to supply a first power supply voltage via first power supply pins to the one of the first device and the second device inserted in the bay portion, and to supply a second power supply voltage via second power supply pins to the second device, the method comprising:
    detecting the type of the device inserted in the bay portion on the basis of the signal supplied by the inserted device;
    causing the power supply controller to supply the connector with at least one of the first power supply voltage and the second power supply voltage depending on the detected type; and
    allowing one of a communication between the first device and the first controller and a communication between the second device and the second controller, after the supply.

9. The controlling an information processing apparatus according to claim 8, wherein when the apparatus is notified that the connector is to be disconnected from the first device or the second device,
    depending on the detected type, either the first controller or the second controller is prohibited from communicating with the device, and
    the power supply controller stops the supply of at least either the first power supply voltage or the second power supply voltage depending on the detected type, after the prohibition.

* * * * *